United States Patent
Wato et al.

[11] Patent Number: 6,017,038
[45] Date of Patent: Jan. 25, 2000

[54] MOULDING FOR WINDOW PLATE OF VEHICLE

[75] Inventors: Yasuhiro Wato; Yoshiharu Hayashi, both of Ohbu; Takeshi Tokui; Satoshi Sakamoto, both of Wako, all of Japan

[73] Assignees: Honda Giken Kogyo Kabushiki Kaisha, Tokyo; Tokai Kogyo Co., Ltd., Aichi-ken, both of Japan

[21] Appl. No.: 08/889,646

[22] Filed: Jul. 8, 1997

[30] Foreign Application Priority Data

Jul. 18, 1996 [JP] Japan ..................... 8-206363

[51] Int. Cl.⁷ ........................................ B60J 1/20
[52] U.S. Cl. ..................... 277/630; 52/716.8; 296/93
[58] Field of Search ................... 296/93; 49/496.1; 52/716.5, 716.8, 717.05; 277/630, 634, 644

[56] References Cited

U.S. PATENT DOCUMENTS

| | | | |
|---|---|---|---|
| 2,606,635 | 8/1952 | Clingman | 296/93 X |
| 4,370,832 | 2/1983 | Koike | 49/496.1 X |
| 4,441,755 | 4/1984 | Endo et al. | 296/93 |
| 4,749,225 | 6/1988 | Fuerst et al. | 296/216.03 |
| 4,765,673 | 8/1988 | Frabotta et al. | 296/93 |
| 5,158,335 | 10/1992 | Usuta et al. | 49/476.1 |
| 5,456,049 | 10/1995 | Goto et al. | 296/93 X |

FOREIGN PATENT DOCUMENTS

| | | |
|---|---|---|
| 0429361 | 5/1991 | European Pat. Off. . |
| 0435685 | 7/1991 | European Pat. Off. . |
| 2591953 | 6/1987 | France . |
| 8151237 | 6/1996 | Japan . |
| 9200991 | 1/1994 | Netherlands . |

*Primary Examiner*—Anthony Knight
*Assistant Examiner*—Greg Binda
*Attorney, Agent, or Firm*—Stephen G. Stanton; John S. Munday; Munday and Stanton

[57] ABSTRACT

To prevent abnormal sounds made by the vibrations of the tip of a seal lip of the molding for a window plate of a vehicle which are created when the air is sucked out from the inner cavity by the difference in pressure between the inside and the outside of the seal lip when the vehicle runs at high speeds, a seal lip body 4a extends in the direction of a vehicle body panel P from the leg of the molding 1 for a window plate and a folded-back lip 4b is consecutively integrally formed such that it folded back in the opposite inward direction from the tip of the seal lip body 4a into the cavity 5 between itself and the vehicle body panel P and extends along the vehicle body panel P. When the vehicle runs at high speeds, even if the seal lip 4a is moved up by the difference in pressure between the inside and the outside of the seal lip body 4a, the folded-back lip 4b is pressed on the vehicle body panel P and thus the air does not leak from the cavity 5. Therefore, it can prevent the abnormal sounds which are produced when the air leaks.

1 Claim, 4 Drawing Sheets

MOULDING FOR WINDOW PLATE OF VEHICLE

FIELD OF INVENTION

The present invention pertains to the field of the art of a moulding for a window plate of a vehicle.

Background of Invention

The moulding for the window plate like this is mounted to the edge of the window plate, or the window glass, of a vehicle such as an automobile, a train or the like and is disposed between the window glass and a vehicle panel, or a window frame, to prevent the entry of rain, dust or the like into the vehicle from a gap between them.

FIG. 4 is a perspective view of a main part showing the state in which a moulding 30 is attached to the window plate G like this.

But a conventional moulding for the window plate has a problem that the vehicle makes abnormal sounds when it runs at high speeds. The mechanism of making abnormal sounds like this will be described in connection with FIGS. 4 to 6.

As shown in FIGS. 4, 5, when the vehicle runs at high speeds, the air flows at high speeds (V1) in the outside of a seal lip 34 but the air entering from the periphery of a hood and a fender flows at considerably slow speeds (V2) in the inside of the seal lip 34. Therefore, as shown in FIG. 6, the pressure is considerably negative (P1) in the outside of the seal lip but the pressure is a little negative (P2) in the inside of the seal lip.

Accordingly, the pressure difference (P1<P2) caused by the difference in speed (V1>V2) between the inside and the outside of the seal lip 34 produces a force to push and to open the seal lip 34 and when the force becomes larger than the reaction force of the seal due to the elasticity of the seal lip 34, as shown in FIG. 6, the air in cavity inside the seal lip 34 is sucked out. And, in FIG. 6, a reference numeral 40 shows the rain gutter in the side which prevents rain from flowing to the side.

In this way, variations in pressure happen when the air leaks and thus exert a vibration force on the seal lip 34 to produce self-excited vibrations at the tip of the seal lip 34.

A person in the vehicle room directly hears the self-excited vibrations at the tip of the seal lip 34 as sounds (like the sounds of a reed) or hears the vibrations transmitted to the vehicle body as abnormal sounds and then feels unpleasant.

And the above described pressure difference increases in proportion to the square of the speed of the vehicle and thus the nigher the speed of the vehicle is, the more intensively the abnormal sounds tends to happen. Moreover, when the head wind blows, the wind speed relative to the vehicle body increases and then tends to produce the abnormal sounds.

In order to cope with this problem in the conventional moulding for the window plate an EPT sealer has been consecutively or partially placed on the vehicle body panel side of the base of the window moulding in the direction of the length of the window moulding or hollow space has been integrally formed with the window moulding from the base of the window moulding toward the vehicle body panel side, whereby the air is hard to flow in the cavity in question.

But it is impossible to completely hermetically seal the cavity in question with these measures and the air flowing in through a very narrow gap is sucked out from the inside of the seal lip and as the result of this the above described abnormal sounds have happened to be produced.

SUMMARY OF INVENTION

The present invention solves the above-described problems by a moulding for a window plate of a vehicle comprising a seal lip which is attached to the edge of the window plate of a vehicle and is disposed between the above described window plate and a vehicle panel and is elastically put into contact with the above described panel, wherein the above described seal lip has an integrally formed folded-back lip which extends in an opposite inward direction from the tip of the seal lip body extending outward.

When the vehicle runs at high speeds, pressure difference is produced between the outside of the seal lip and the inside of the seal lip.

But since the seal lip according to the present invention has an integrally formed folded-back lip which extends in an opposite inward direction from the tip of the seal lip body extending outward, even if a pressure difference is produced between the inside and the outside of the vehicle, the folded-back lip is pressed on the vehicle panel to prevent the air in the cavity inside the moulding from leaking.

Accordingly, the tip of the lip is not vibrated by the air leaking from the cavity inside the moulding and thus the occurrence of abnormal sounds due to the vibration is prevented.

BRIEF DESCRIPTION OF THE DRAWINGS

FIG. 1 is a cross sectional view of the moulding for the window plate of the first embodiment according to the present invention.

FIG. 2 is a cross sectional view of the moulding for the window plate of the second embodiment according to the present invention.

PREFERRED EMBODIMENTS

The embodiments of the present invention will be hereinafter described in connection with FIGS. 1 to 3.

Figure 1A:
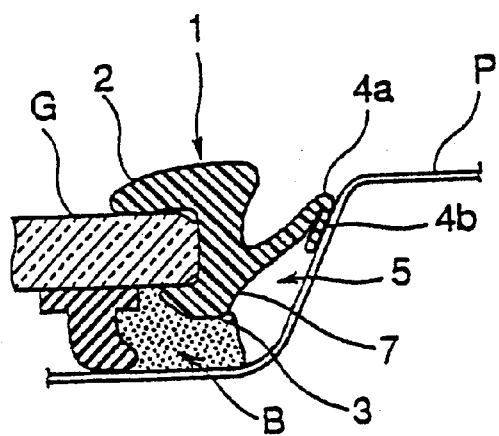
FIG. 1(a) is a cross sectional view when the moulding is attached.
Figure 1B:
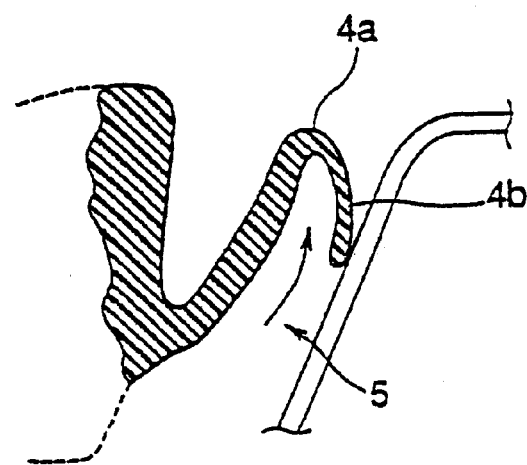
FIG. 1(b) is an enlarged cross sectional view of the moulding when the vehicle runs at high speeds.
Figure 1C:
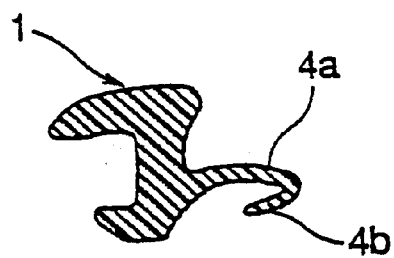
FIG. 1(c) is a cross sectional view of the moulding before attachment.

The moulding 1 for the window plate of the first embodiment of FIG. 1 is usually made of resin formed by extrusion. The lip 2 of the window plate side extends toward the center of the outer surface of the window plate G to a predetermined width and the bottom projection 3 extends from the bottom side to a predetermined width, respectively, and thus the lip 2 of the window plate side and the bottom projection 3 pinch the window plate G.

A leg 7 is sticked on a vehicle panel P with adhesive B.

A seal lip body 4a extends in the direction of the vehicle body panel P from the leg 7 of the moulding 1 for this window plate to the predetermined width.

A folded-back lip 4b is consecutively integrally formed such that it folded back in the opposite inward direction from the tip of the seal lip body 4a into the cavity 5 between itself and the vehicle body panel P and extends along the vehicle body panel P.

FIG. 1 (c) shows the shape of the moulding 1 before attachment to the panel. It will become clear upon comparing FIG. 1 (a) with FIG. 1 (c) that the seal lip body 4a is elastically deformed in nearly 45° and the folded-back lip 4b is pressed on the vehicle body panel with the cavity 5 by the elastic force thereof to perform sealing function when it is sticked to the panel. And it is needless to say that the state of this elastic deformation is the same in the following other embodiments.

When the vehicle runs at high speeds, even if the seal lip 4a is moved up by the difference in air pressure between the inside and the outside of the seal lip body 4a, the folded-back lip 4b is pressed on the vehicle body panel P, as shown in FIG. 1 (b), and thus air does not leak from the cavity 5. Therefore it can prevent the occurrence of the abnormal sounds made by the vibrations of the conventional seal lip which are created when the air leaks.

Figure 2A:
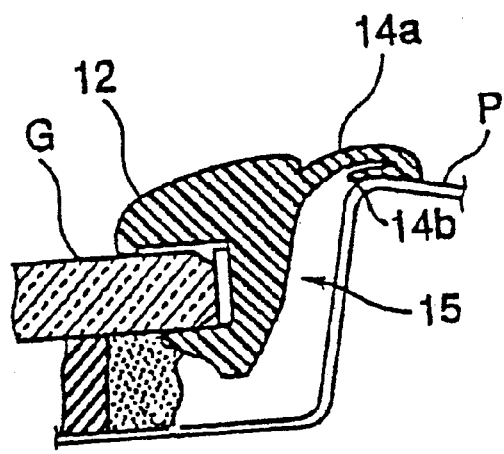
FIG. 2(a) is a cross sectional view when the vehicle does not run.
Figure 2B:
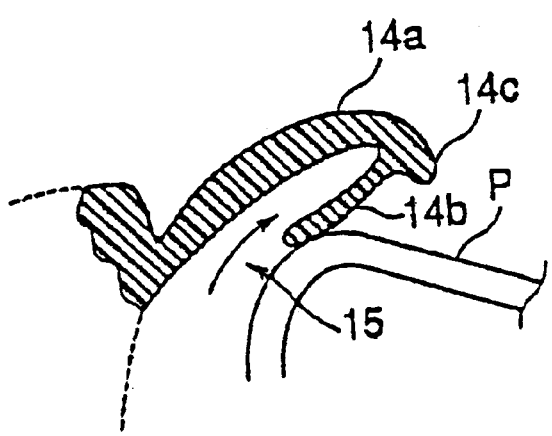
FIG. 2(b) is an enlarged cross sectional view of the moulding when the vehicle runs at high speeds.

Next, FIG. 2 shows the second embodiment according to the present invention in which the seal lip body 14a is formed such that it does not extend from the leg but extends nearly flush with the lip 12 of the window plate side.

Moreover, a projection 14c is made at the tip of the seal body 14a of this case such that it is put into contact with the outer surface of the vehicle body panel. And the spirit of folded-back lip which extends in an opposite inward direction from the tip of the seal lip body in what is claimed includes the case like this.

In the embodiment shown in FIG. 2, the folded-back lip 14b is also formed in an inward direction such that it enters between seal lip 14a and the vehicle body panel P and extends along the vehicle body panel P.

When the vehicle runs at high speeds, the seal lip 14a is moved up by the force which is produced by the difference in air pressure between the inside and the outside of the seal lip body 14a when the air in the cavity 15 is going to leak but, as shown in FIG. 2(a), the folded-back 14b is pressed on the vehicle body panel P, whereby the air in the cavity 15 does not leak. Therefore it can prevent the occurrence of abnormal sounds made by the vibrations of the conventional seal lip which are created when the air leaks.

Figure 3:
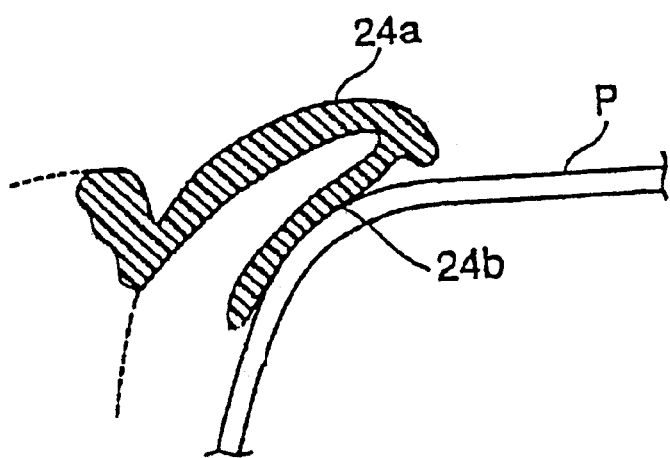
FIG. 3 is an enlarged cross sectional view of the moulding for window plate of the third embodiment according to the present invention.
Figure 4:
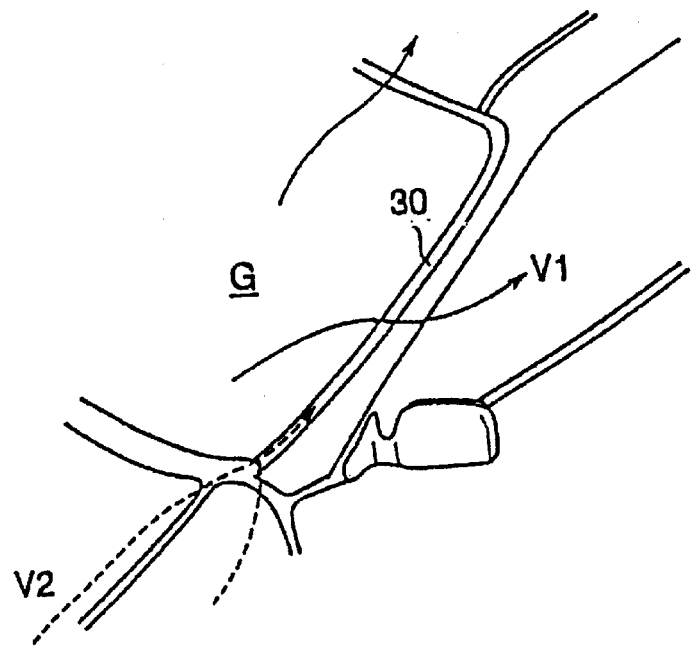
FIG. 4 illustrates the flow of the wind which the vehicle receives when it runs at high speeds.
Figure 5:
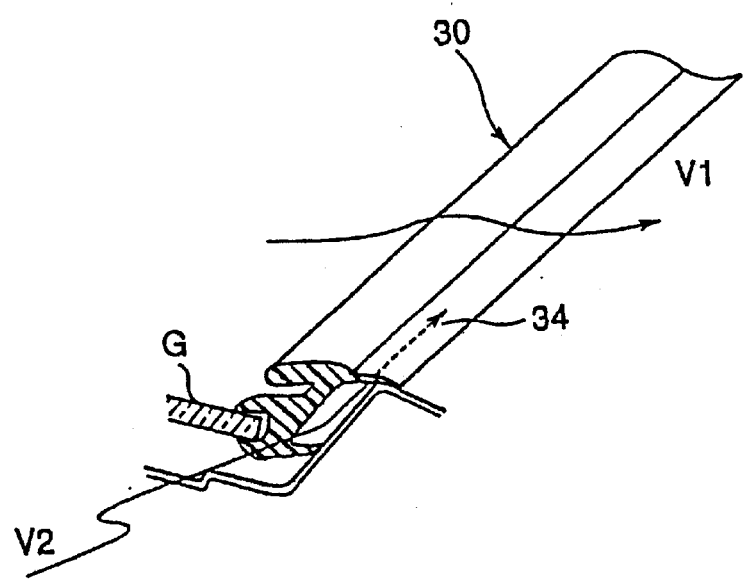
FIG. 5 illustrates the flow of the wind for the moulding for window plate when the vehicle receives when it runs at high speeds.
Figure 6:
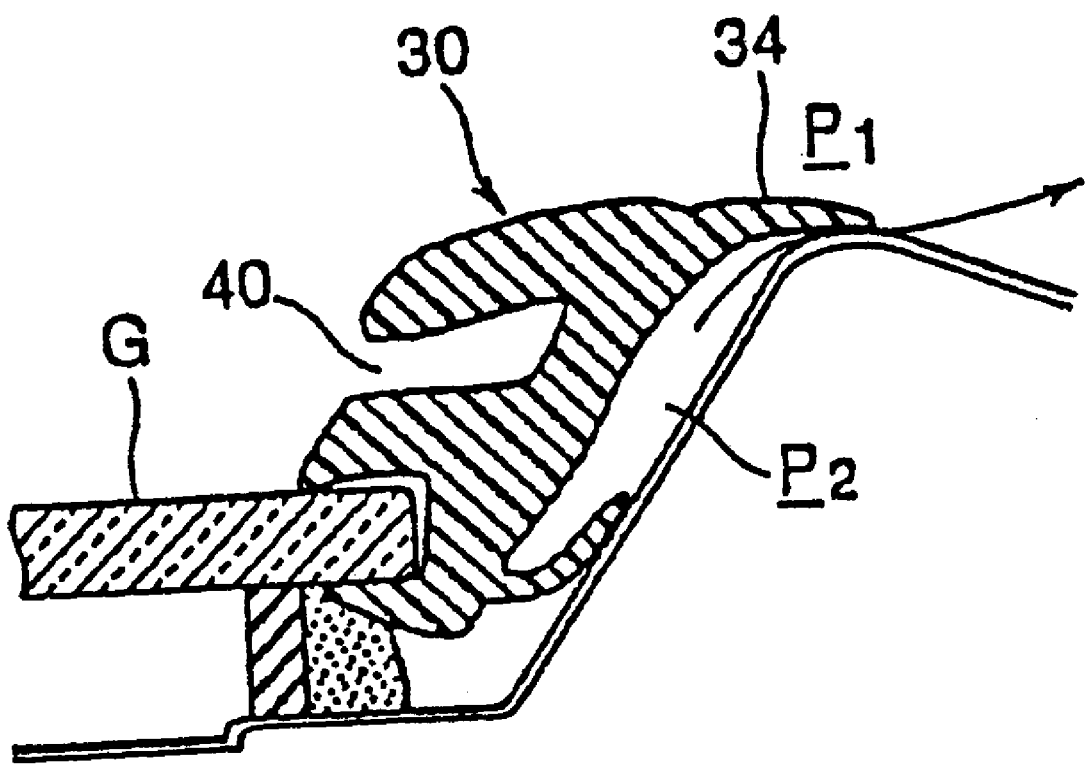
FIG. 6 illustrates in a cross sectional view the state in which the air leaks from the cavity of the moulding for the window plate when the vehicle with a conventional moulding for window plate runs at high speeds.

Next, in the embodiment shown in FIG. 3 the length of the folded-back lip 24b is longer than the length of the folded-back lip 14b of the embodiment shown in FIG. 2.

The length of the folded-back lip 24b is set such that it can prevent the air in the cavity from leaking due to the difference in air pressure between the inside and the outside of the seal lip body 24a even if the vehicle runs at the highest speed thereof.

Advantages of Invention

Since the moulding for window plate according to the present invention prevents the air from leaking from the inside of the seal lip even if the vehicle runs at high speeds, it produces an effect that it can prevent the occurrence of abnormal sounds made by the vibrations of the tip of the seal lip which are created when the air leaks.

What is claimed is:

1. In combination, a device comprising:

(a) a vehicle windshield plate having an outer edge;

(b) vehicle paneling surrounding said windshield plate outer edge; and (c) elastic molding interposed between said windshield plate and said paneling, said elastic molding including a seal lip body having
a lip end mounted to at least a portion of said windshield plate outer edge, and
a tip end having a folded-back lip portion for biased engagement with at least a portion of said paneling to seal said windshield plate to said paneling, whereby rapid movement of ambient air against and around said windshield plate and vehicle paneling creates sufficient pressure differential proximate said seal lip body to move said tip end, said folded-back lip portion having sufficient length to maintain said seal during movement of said tip end to prevent undesired noise caused by displacement of said tip end from said portion of said paneling.

* * * * *